United States Patent
Leclerc et al.

(10) Patent No.: US 7,587,930 B2
(45) Date of Patent: Sep. 15, 2009

(54) DEVICE FOR MEASURING THE POSITION OF A PISTON IN A CYLINDER

(75) Inventors: Henry Roger Leclerc, Juvisy sur Orge (FR); Daniel Germain Alexis Kettler, Chartrettes (FR); Jean-Paul Yvon Bares, Maincy (FR)

(73) Assignee: Hispano Suiza, Colombes (FR)

( * ) Notice: Subject to any disclaimer, the term of this patent is extended or adjusted under 35 U.S.C. 154(b) by 11 days.

(21) Appl. No.: 12/021,020

(22) Filed: Jan. 28, 2008

(65) Prior Publication Data
US 2008/0178665 A1 Jul. 31, 2008

(30) Foreign Application Priority Data
Jan. 29, 2007 (FR) .................................. 07 00596

(51) Int. Cl.
*G01M 15/02* (2006.01)
(52) U.S. Cl. ................................... 73/114.28
(58) Field of Classification Search ............... 73/114.02, 73/114.03, 114.04, 114.05, 114.26, 114.27, 73/114.28, 114.29
See application file for complete search history.

(56) References Cited

U.S. PATENT DOCUMENTS 3,898,399 A * 8/1975 Yasui et al. .................... 200/47
4,361,051 A * 11/1982 deFasselle et al. ........ 73/861.54
4,489,614 A * 12/1984 deFasselle et al. ........ 73/861.54
5,507,253 A * 4/1996 Lowi, Jr. .................... 123/56.9
6,837,054 B2 * 1/2005 Brocard et al. ................. 60/771

* cited by examiner

*Primary Examiner*—Eric S McCall
(74) *Attorney, Agent, or Firm*—Oblon, Spivak, McClelland, Maier & Neustadt, P.C.

(57) ABSTRACT

This invention relates to a device for measuring the position of a piston (2) in a cylinder (1), extending according to an axis, the device comprising at least two position sensors (3, 4) respectively comprising: a first sensor member (20, 40) integral with a supporting pallet (31) linked to the piston (2), a second sensor member (10, 30) integral with the cylinder (1), the first and second members of each sensor being arranged for being mobile in translation one relative to the other, along an axis parallel to the axis of the cylinder (1), the device being characterized in that the first sensor members (20, 40) are integral with the same supporting pallet (31) being linked to the piston (2) by a ball joint link (50). Using the device of this invention, a position sensor can be arranged in the cylinder, without having the transversal strains on the piston being transmitted to it, while the piston remains free in rotation about the axis of the cylindrical barrel.

10 Claims, 3 Drawing Sheets

DEVICE FOR MEASURING THE POSITION OF A PISTON IN A CYLINDER

This invention relates to the field of position sensors, for measuring the position of a piston in a cylinder, including those used on aircraft engines.

A position sensor, such as an active (inductive) linear shift sensor, more known to the man of the art under its English acronym LVDT, meaning "Linear Variable Differential Transformer", makes it possible to determine the longitudinal position of a piston in a cylinder.

Referring to FIG. 1, a LVDT type sensor 100 comprises a mobile ferromagnetic core 120, fixed on a stem 121 along an axis 100A, and a fixed transformer 110, made of three cylindrical coils coaxial with the axis 100A of the stem 121, defining a primary winding 111 and two secondary windings 112, 113. In operation, the stem 121 is shifted into translation on the axis thereof 100A. The core 120 generates in windings 111, 112, 113, through magnetic induction, a tension between windings which is proportional to the position of the ferromagnetic core 120 in the transformer 110. The position of the stem 21 in the sensor is thereby inferred.

Referring to FIG. 2, it is known to use a LVDT type sensor in a jack 200. Such a jack 200 comprises a cylinder 201, extending along an axis 200A, wherein a piston 202 extends, being mobile in translation on the axis 200A. The piston 202 comprises, at the downstream end thereof, a piston head 202A, the external diameter of which corresponds to the internal diameter of the cylinder 201, where it is conventionally guided.

In the remaining of the description, upstream and downstream notions are defined with respect to the piston 202. The latter is subjected to a driving force at the upstream end thereof, the downstream part thereof moving in the cylinder 201. In other words, the upstream side is located on the side of the cylinder 201 through which the piston 202 goes out.

The transformer 210 of the LVDT type sensor is fixed at the downstream end of the cylinder 201, the axis of the transformer 210 coinciding with the axis 200A of the cylinder 201. The ferromagnetic core 220 of the sensor is mounted on a stem 221 being integral with the piston 202 and extending along the axis 200A.

As the core 220 is integral with the piston 202 and the transformer 210 integral with the cylinder 201, the position of the piston 202 in the cylinder 201 is inferred from the measurement of the position of the core 220 in the transformer 210.

In the aeronautics field, the safety standards require a high reliability level for measuring and monitoring equipment. Thus, for measuring the position of a piston in a jack cylinder, it is necessary to provide two LVDT sensors in the jack, so that, should one of the sensors become defective, the other sensor carries out the measurements.

It is known from Patent FR 2594515 a device for measuring the position of a piston in a jack cylinder comprising two LVDT type position sensors.

FIG. 3 illustrates a schematic functional section view of such a device, arranged on a jack 300 comprising a piston 302, being mobile in a cylinder 301 along an axis 300A. A supporting pallet 303 is transversally fixed in the hollow piston 302. The sensor cores 320, 340 are mounted on two stems 321, 341, fixed at the upstream end thereof on the downstream side of the pallet 303. The stems 321, 341 extend parallel to the axis 300A, the cores 320, 340 extend respectively and concentrically to transformers 310, 330, the transformers 310, 330 being fixed at the downstream end of the cylinder 301.

The piston 302 is driven into translation on the axis 300A. It should furthermore be free in rotation around such an axis 300A. To this end, in the device according to the Patent FR 2594515, a circumferential bearing 350 is arranged between the pallet 303 and the piston 302, allowing the piston 302 to be driven into rotation about the axis 300A without imparting the rotation motion to the pallet 303 and to the cores 320, 340. The cores 320, 340 remain integral in translation of the piston 302 and aligned with their respective transformer 310, 330. Sensors are thus able to measure the position of the piston 302 in the cylinder 301.

In operation, the piston 302 is generally subjected to transversal forces, making it flex and able to make stems 321, 341 flex and off-centre them with respect to the axis 300A of the cylinder 301. The cores 320, 340 are then no longer centred with respect to the respective transformer thereof 310, 330 and are damaged, resulting in a decrease of the life of the sensors as well as a lesser accuracy of measurements.

The invention aims at providing a device for measuring the position of a piston in a cylinder, able to comprise two LVDT type sensors for providing for the device reliability, allowing the piston to be free in rotation about its axis and not being damaged by the piston optionally bending.

To this end, this invention relates to a device for measuring the position of a piston in a cylinder, extending along an axis, the device comprising at least two position sensors, respectively comprising:

a first sensor member integral with a supporting pallet connected with the piston, a second sensor member integral with the cylinder, the first and second members of each sensor being arranged for being mobile into translation one relative to the other, along an axis parallel to the axis of the cylinder, the device being characterized in that the first sensor members are integral with the same supporting pallet being connected to the piston through a ball joint link.

By "ball joint link", there is understood a link between two members, comprising three levels of freedom in rotation and none in translation.

Using the device of this invention, a position sensor can be arranged in the cylinder, without having the transversal strains on the piston being transmitted to it, whereas the piston remains free in rotation about the axis of the cylinder. Measurement of the piston position in the cylinder is therefore accurate with no risk of damage in the sensor.

This invention overcomes a particular problem, occurring in two position sensor devices, but it applies as well to a device with more than two sensors.

Furthermore, bearing suppression, with respect to the device of the Patent FR 2594515 allows to make easy the device maintenance: a ball joint is less apt to get jammed.

The invention applies more particularly to jacks, but it applies more generally to any device comprising a cylinder where a piston mobile in translation extends. Thus, the invention applies, for example, to metering devices, comprising a two headed piston, driven in a cylinder, for regulating a fluid flow rate. Such a metering device will be described further in detail hereinafter.

Preferably, the position sensor is a LVDT type sensor. Advantageously in such a case, the first member comprises a stem, supporting a ferromagnetic core, and the second sensor member comprises a transformer.

Preferably, the ball joint link comprises a sphere supported in a sphere flange. The sphere may be, either integral with the piston, or integral with the first sensor member.

According to another embodiment, the sphere flange is crimped into a part being integral with the first sensor member.

This invention also relates to an assembly comprising a cylinder, a piston and a measuring device, such as presented hereinabove, and an aircraft engine comprising such an assembly.

This invention still relates to a jack or a metering device.

This invention will be better understood with the following description of preferred embodiments of the device of the invention, referring to the appended drawing, in which.

Figure 1:
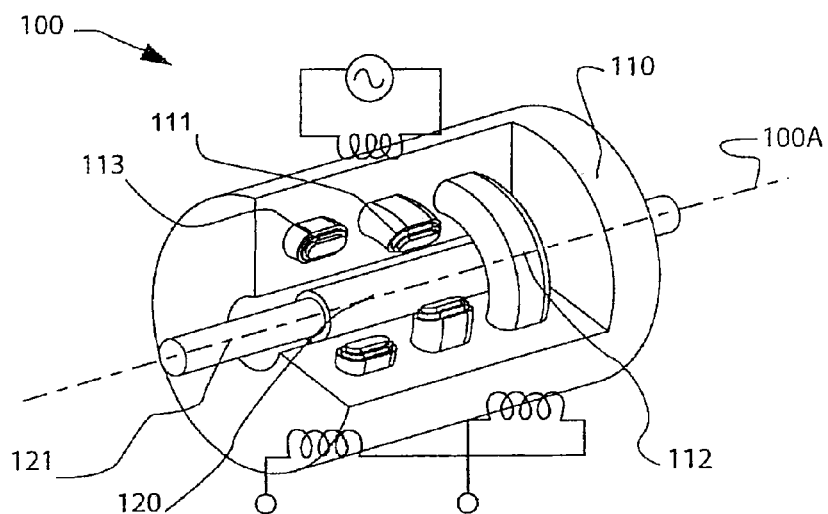
FIG. 1 illustrates a partially exploded, perspective schematic view of a LVDT type position sensor.
Figure 2:
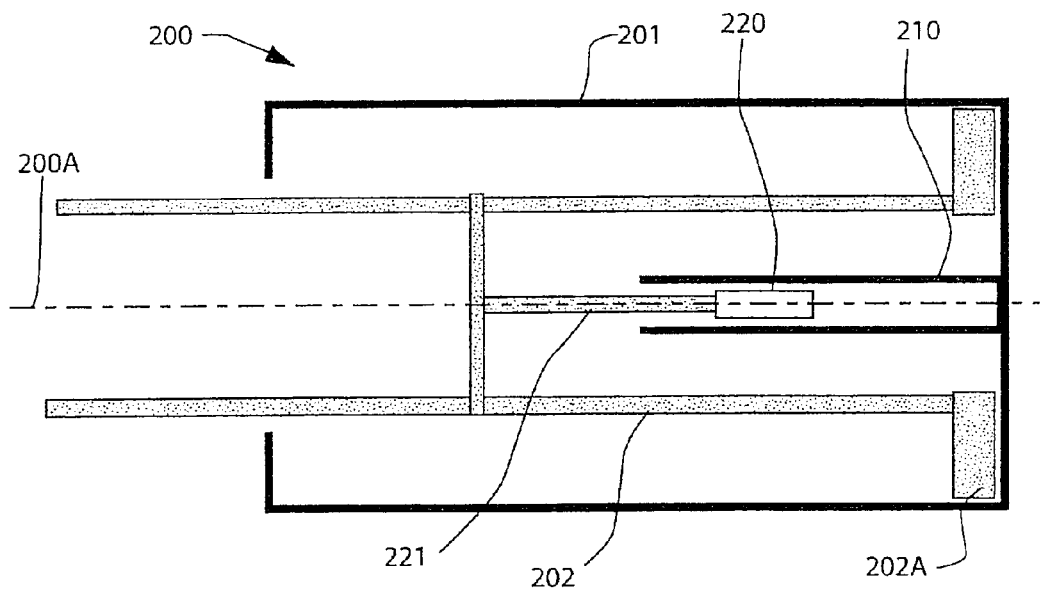
FIG. 2 illustrates a block diagram of a measuring device according to the prior art.
Figure 3:
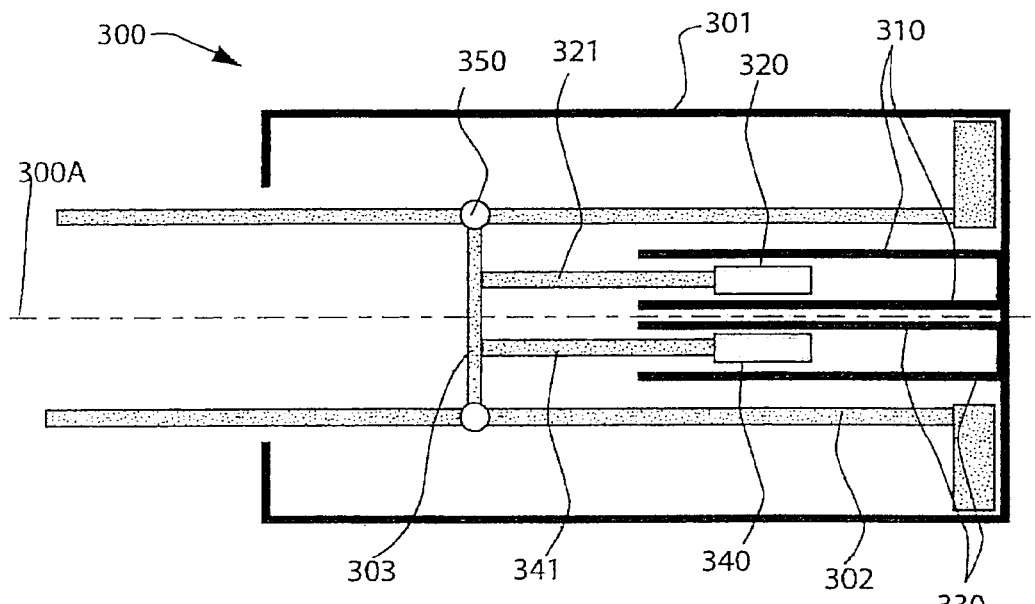
FIG. 3 illustrates a block diagram of another measuring device according to the prior art.
Figure 4:
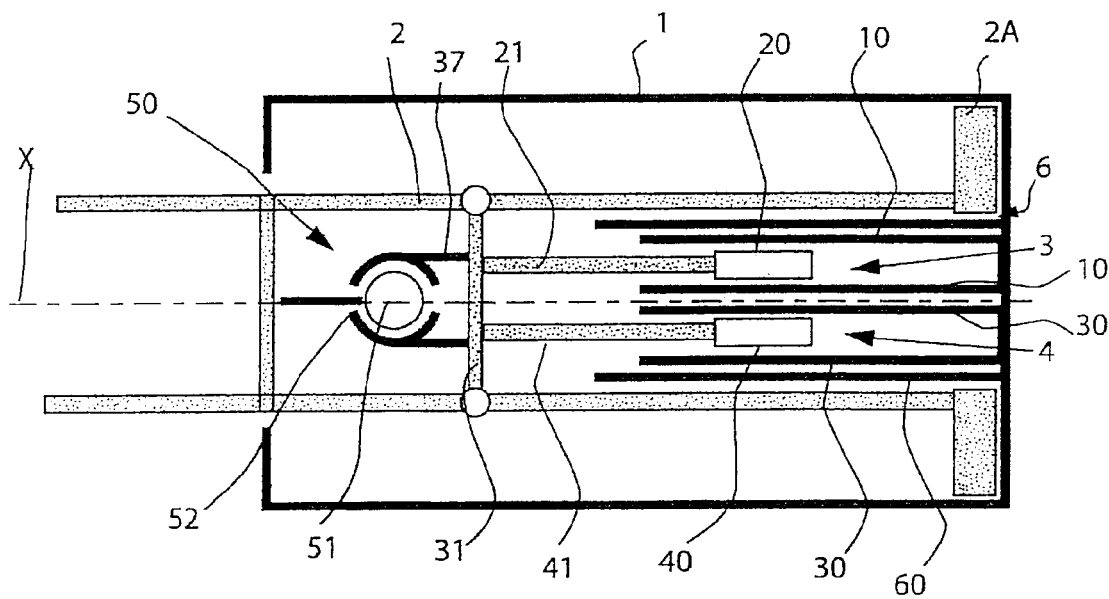
FIG. 4 illustrates a block diagram of a measuring device according to the invention according to the embodiment of FIG. 5.

Referring to FIG. 4, a jack comprises a cylinder 1, extending along an axis X, where a piston 2 is inserted, comprising a piston head 2A, the external diameter of which corresponds to the internal diameter of the cylinder 1. The jack comprises a device for measuring the position of the piston 2 relative to the cylinder 1, comprising two LVDT type position sensors 3, 4.

Each sensor 3, 4 comprises a ferromagnetic core 20, 40, cooperating with a transformer 10, 30, as previously described. Transformers 10, 30 are longitudinally arranged along the axis X in the cylinder 1, and fixed at the downstream end thereof. Transformers 10, 30 are enclosed in a protective jacket 60 longitudinally extending in the cylinder 1, with the downstream end of the jacket 60 being fixed integral with the downstream end of the cylinder 1. The jacket 60 concentrically extends inside the piston 2, comprising, at the downstream end thereof, a passage aperture 6 for the jacket 60.

Each core 20, 40 of the sensors 3, 4 is supported by a stem 21, 41, parallel to the axis X and aligned with the corresponding transformer 10, 30, within which it is arranged for extending coaxially. The upstream ends of the stems 21, 41 are fixed integrally with the downstream side of a supporting pallet 31, transversally arranged in the piston 2. The pallet 31 has overall the shape of a disc.

Figure 5:
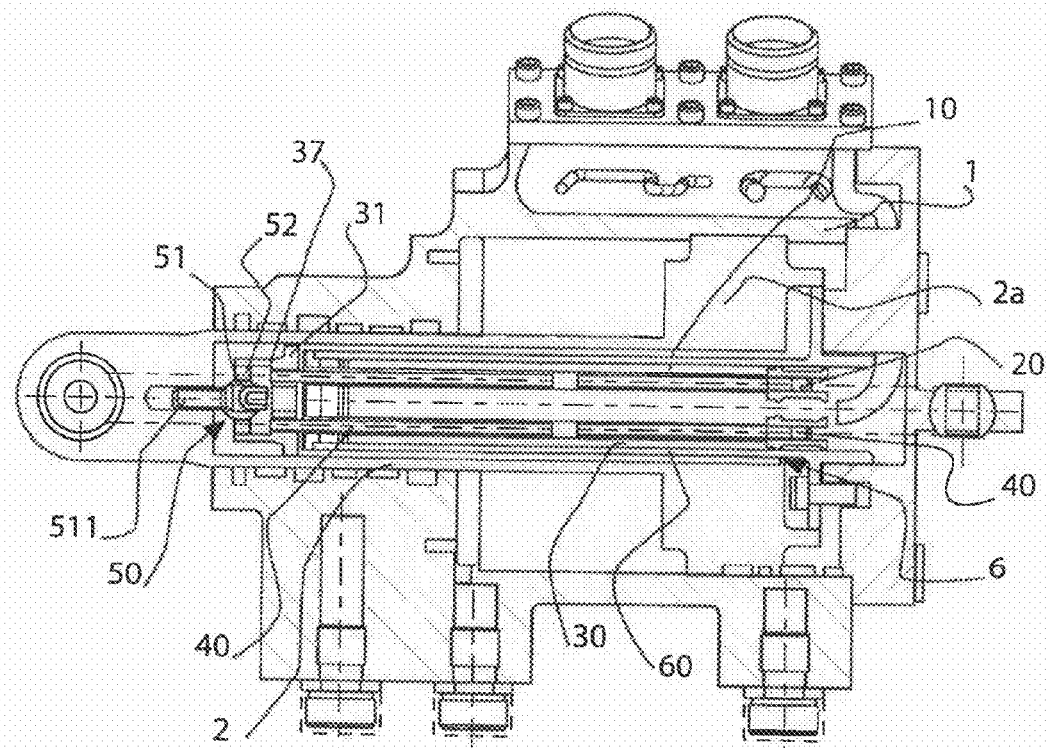
FIG. 5 illustrates a sectional view of a jack with a measuring device according to the invention.

Referring to FIG. 5, the piston 2 is hollow, i.e. it has the shape of a sheath longitudinally extending in the cylinder 1. The pallet 31, supporting the cores 20, 40, is linked to the piston 2 via a linking means, here a ball joint link, the link being made inside the sheath formed by the piston 2. Because of the ball joint link 50, the pallet 31 is free in rotation according to three levels of freedom relative to the piston 2, but it remains integral with the latter in translation on the axis X.

The ball joint 50 here comprises a sphere 51, mounted in a sphere flange 52 having the shape of a spherical shell. Such a sphere flange 52 is also known to the man of the art, being referred to by the term "cage". Its function is to support the sphere 51, being integral with it in translation, but free in rotation. The sphere 51 is integral with the piston 2 and the flange 52 is integral with the pallet 31.

The sphere 51 here supports a finger 511 extending on the upstream side and fixed integrally with the piston 2. The sphere flange 52 is advantageously crimped into a cylindrical portion 37 longitudinally extending downstream from the upstream side of the pallet 31, the free ends of the cylindrical portion 37 being folded down on the sphere flange 52 in order to support it fixedly.

Having described the structure of the means of the invention, its operation and implementation will now be described.

Upon jack operation, the upstream end of the piston 2 is driven into translation on the axis X relative to the cylinder 1. The sphere 51, integral with the piston 2, shifts into translation; it drives the sphere flange 52, being integral with it, and therefore the pallet 31 and the cores 20, 40 it supports. The cores 20, 40 are therefore driven into translation on the axis X in the respective transformer 10, 30, the transformers 10, 30 being integral with the cylinder 1. The position of the piston 2 in the cylinder 1 is therefore inferred from the measurement, carried out by the sensors 3, 4, of the position of the cores 30, 40 in their transformer 10, 30.

The piston 2 is furthermore free in rotation about its axis X. When rotating, the piston 2 drives the sphere 51, the latter freely rotating in the sphere flange 52. No motion is transmitted to the cores 20, 40, that remain aligned in their respective transformer 10, 30. The ball joint link 50 thus makes possible to avoid any misalignment of the sensors 3, 4 upon the rotation of the piston 2 about its axis X.

In operation, the transversal forces may additionally be applied onto the upstream part of the piston 2, resulting in the piston 2 bending. Bending is compensated by the sphere 51, coming into rotation in the sphere flange 52. No motion is transmitted to the cores 20, 40, that remain aligned in their respective transformer 10, 30. The ball joint link 50 thereby allows for the sensors 3, 4 to be protected when transversal forces are applied at the upstream end of the piston 2.

When the jack is in operation, the piston 2 can be subjected to forces generating motions of translation, of rotation about its axis or of bending of the piston 2. Through the ball joint link 50, only the translation motions on the axis X of the cylinder 1 are transmitted to the cores 20, 40.

The ball joint link 50 is less likely to become jammed, as dust is less likely to enter inside the sphere flange 52.

Figure 6:
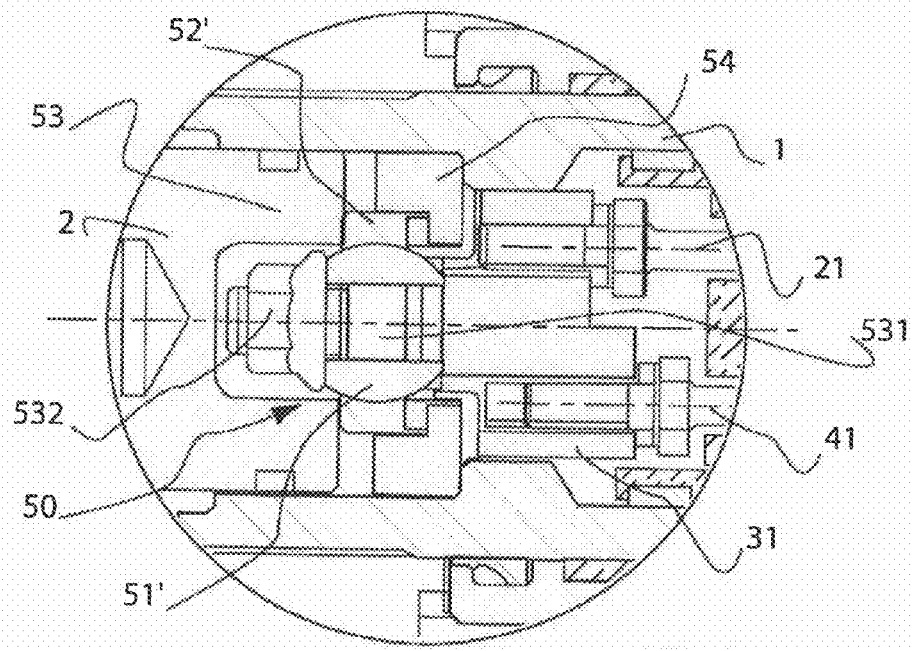
FIG. 6 illustrates a sectional view of a jack with a measuring device according to another embodiment of the invention.

In another embodiment, referring to FIG. 6, the sphere 51' is integral with the pallet 31 and the sphere flange 52' is integral with the piston 2. The sphere 51' comprises an axis bore X, crossed by a screw 531 having its downstream end screwed into the pallet 31 supporting the cores 20, 40 of the sensors 3, 4. The screw 531 is clamped at its upstream end by a nut 532 allowing for the sphere 51' to be secured on the pallet 31.

The sphere flange 52' is fixed to the piston 2, clamped between a nut 53 integral with the piston 2 and a wedge 54, the wedge 54 being inserted on the downstream part of the sphere flange 52'.

This invention has been presented in relation with a jack, but it applies to other types of devices comprising a piston mobile in translation in a cylinder, such as a metering device or an aircraft engine comprising a assembly involving a cylinder, a piston and a measuring device according to the invention.

In a metering device, a piston shifts into translation in a metering device cylinder. Two radial holes are arranged in the cylinder, respectively defining a fluid inlet and a fluid outlet.

The piston comprises two plugging heads the external diameter of which corresponds to the internal diameter of the cylinder, coaxial and connected by a shaft driven into translation according to the axis of the cylinder. In a closing position of the metering device, the heads completely plug the holes, preventing any fluid communication. In an opening position, the piston is shifted into translation in the cylinder of the metering device, thereby providing for a partial or total opening of the holes, and a fluid communication from the inlet to the outlet. The piston translation allows thus to "regulate" or "dose" the fluid flow rate.

In order to determine the position of the piston, similarly to the previous embodiment, a supporting pallet is transversally arranged in the piston, the pallet supporting two stems on which are respectively mounted the cores of the LVDT type position sensors. The cores are respectively aligned with their respective transformer, fixed at the downstream end of the cylinder of the metering device. An aperture is provided at the downstream end of the piston, allowing the transformers to pass. The supporting pallet is linked to the piston by means of a ball joint link, the ball sphere being, for example, fixed to the piston and the sphere flange being fixed to the supporting pallet.

It is understood that this invention equally applies to proximity sensors such as a pierro type capacitive proximity sensor, an inductive proximity sensor, a Hall effect sensor or a presence or infrared proximity sensor, for example.

The invention claimed is:

1. A device for measuring the position of a piston in a cylinder, extending along an axis, the device comprising at least two position sensors, respectively comprising:
   a first sensor member integral with a supporting pallet linked to the piston,
   a second sensor member integral with the cylinder, the first and second members of each sensor being arranged for being mobile in translation one relative to the other, along an axis parallel to the axis of the cylinder, the device being characterized in that the first sensor members are integral with the same supporting pallet being connected to the piston through a ball joint link.

2. A device according to claim 1, wherein at least one position sensor is a LVDT type sensor.

3. A device according to claim 2, wherein the first sensor member of said position sensor comprises a stem, supporting a ferromagnetic core, and the second sensor member comprises a transformer.

4. A device according to claim 1, wherein the ball joint link comprises a sphere supported in a sphere flange.

5. A device according to claim 4, wherein the sphere flange is integral with the first sensor member.

6. A device according to claim 5, wherein the sphere flange is crimped into a part integral with the first sensor member.

7. An assembly comprising a cylinder, a piston and a measuring device according to claim 1.

8. An aircraft engine comprising an assembly according to claim 7.

9. A jack comprising a measuring device according to claim 1.

10. A metering device comprising a measuring device according to claim 1.

* * * * *